(12) United States Patent
Brusveen et al.

(10) Patent No.: US 8,242,918 B2
(45) Date of Patent: Aug. 14, 2012

(54) TEMPERATURE MONITORING FOR ELECTRICAL WIRES AND ELECTRICAL CONNECTION APPARATUS

(76) Inventors: Stig Werner Brusveen, Gjøvik (NO); Anders Sande, Gjøvik (NO)

( * ) Notice: Subject to any disclaimer, the term of this patent is extended or adjusted under 35 U.S.C. 154(b) by 649 days.

(21) Appl. No.: 12/160,076

(22) PCT Filed: Jan. 5, 2007

(86) PCT No.: PCT/NO2007/000005
§ 371 (c)(1),
(2), (4) Date: Nov. 7, 2008

(87) PCT Pub. No.: WO2007/094674
PCT Pub. Date: Aug. 23, 2007

(65) Prior Publication Data
US 2009/0224926 A1 Sep. 10, 2009

(30) Foreign Application Priority Data
Jan. 5, 2006 (NO) .................................. 20060052

(51) Int. Cl.
*G08B 21/00* (2006.01)
(52) U.S. Cl. .................... 340/595; 340/584; 340/539.27; 340/635
(58) Field of Classification Search .................. 340/577, 340/584–599, 539.1–539.3, 635
See application file for complete search history.

(56) References Cited

U.S. PATENT DOCUMENTS

| | | | | |
|---|---|---|---|---|
| 3,927,571 A * | 12/1975 | Athey | ........................... | 374/111 |
| 4,133,700 A * | 1/1979 | Hollander et al. | ............ | 374/181 |
| 5,600,306 A | 2/1997 | Ichikawa et al. | | |
| 6,429,777 B1 * | 8/2002 | Boyden | ........................ | 340/584 |
| 7,889,071 B2 * | 2/2011 | Theimer et al. | .......... | 340/539.13 |
| 2002/0097546 A1 | 7/2002 | Weinberger | | |
| 2005/0046584 A1 * | 3/2005 | Breed | ..................... | 340/825.72 |
| 2005/0110645 A1 | 5/2005 | Boyden | | |

FOREIGN PATENT DOCUMENTS

GB  2200232 A  7/1988

\* cited by examiner

*Primary Examiner* — Jeffery Hofsass
(74) *Attorney, Agent, or Firm* — Rothwell, Figg, Ernst & Manbeck, P.C.

(57) ABSTRACT

Monitoring apparatus (100, 200, 300) for registration and warning of overtemperature, particularly in connection with harmful heat development in electric installations, as for example outlets, switches and fuse equipment. The apparatus provides for timely warning of heat development, so that overheating and damage is avoided, whereby the operation of electric installation equipment for mounting in electric installations, will have a significantly improved safety. The temperature registration is performed in a unit (100) by means of a sensor (1) which provides an electrical magnitude that is influenced by the temperature, for example a thermistor, which is a temperature-dependent resistor. When a low current is applied to such a component, it will result in a temperature-dependent voltage drop that is measured and gives a direct measure of the temperature. If the temperature exceeds a given value, an alarm unit (200) is activated, and this is turn can provide for remote warning of a central block or plant (300).

7 Claims, 3 Drawing Sheets

TEMPERATURE MONITORING FOR ELECTRICAL WIRES AND ELECTRICAL CONNECTION APPARATUS

CROSS REFERENCE TO RELATED APPLICATION(S)

Figure 1:
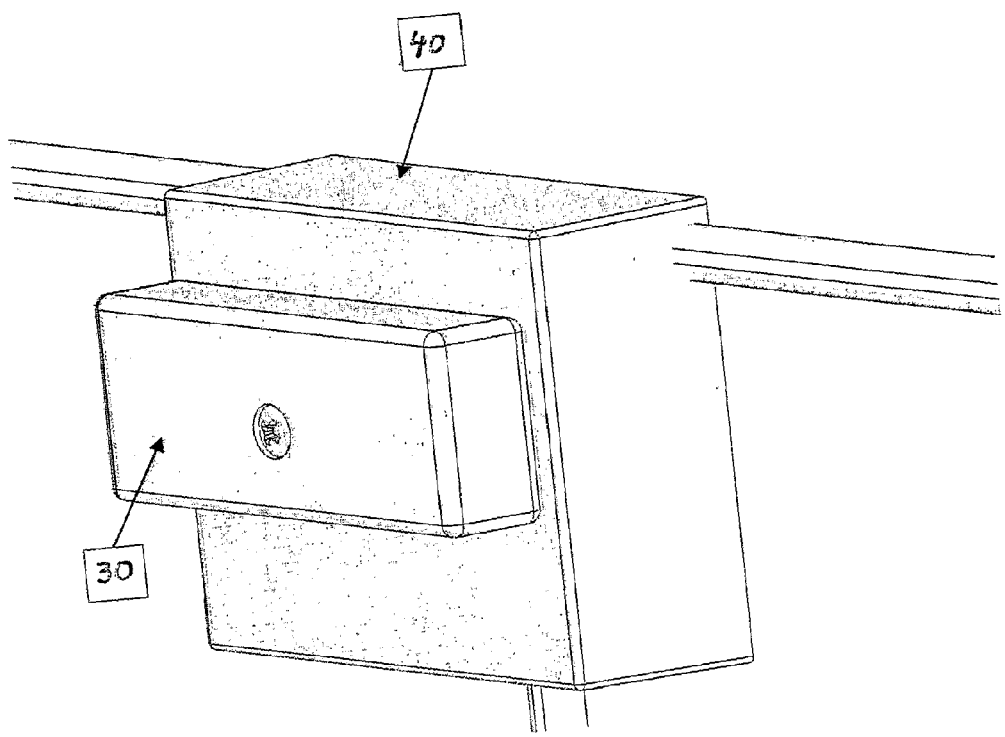

This application is a 35 U.S.C. §371 National Phase Entry Application from PCT/NO2007/000005, filed Jan. 5, 2007, designating the United States, and Norwegian Application 20060052, filed Jan. 5, 2006, the disclosures of which are incorporated herein in their entirety by reference.

INTRODUCTION

The present invention relates to a monitoring apparatus for detection, registration and warning with respect to an overtemperature, particularly in connection with harmful heat development in electric installations, as for example outlets, switches and fuse equipment. The purpose of the monitoring apparatus is to provide for timely warning of heat development so that overheating and damage is avoided, whereby the operation of electric installation equipment for mounting in electric installations will have significantly improved safety.

BACKGROUND

Each year fires lead to the loss of large values and many human lives. In the year 2002 the insurance companies in Norway paid out NOK 1.6 billion for fires in houses and 1.3 billion for fires in trade and industry buildings. According to statistics regarding 2001 a total of 65 persons lost their lives in fires in Norway during the year.

9 percent of these fires were caused by heat development in current outlets, switches and fuse equipment. Such overheating may arise in consequence of spark formation, creeping currents in carbonised insulation material or direct series arcs, and mostly well before the circuit is loaded with its maximum current that would result in fuse burning. As electric installations operate today, a traditional fuse in the fuse box will not detect such local overloading or overtemperatures.

Thus, the purpose of the invention is to register or detect and warn with respect to harmful heat development before damage is caused in electric installations or in other places. The invention is not dependent upon the voltage level in an electric installation and will be applicable both in low and high voltage installations. This is obtained by means of the features recited in claims 1-7.

It is previously known to install thermocouples or fuses in electric articles such as hair dryers, extension cord reels and so forth so that the current is interrupted when the temperature rises above a certain temperature limit, in order to protect against overheating. The drawback is that the whole load must flow through the thermocouple or the fuse, and that a series connection introduces junction points which increase the risk of faults occurring.

There is also a risk of a too slow reaction in that often one does not want to break the current or disconnect the voltage at a too early instant, but instead chooses to operate in the border region of what the article or device can tolerate. There is often also included a reset mechanism ("reset button") for manual resetting. This means that the possible overload may be switched on again, without removal of the cause of the interruption.

SHORT SUMMARY OF THE INVENTION

On this background one has arrived at the invention, namely an electric monitoring apparatus with a separate temperature detection unit being particularly suitable for mounting on electric units or inside or at the outside of connection points in an electric installation, for example switches, outlets, connection boxes, distribution boxes, contactors, fuses and so forth.

The apparatus is adapted to give warning with a direct message, as for example SMS or MMS, to the house owner, electrician or security firm if it is connected to a central plant, for example by a wireless or physical connection.

The advantage of the apparatus according to the invention is that it does not introduce additional connection points in an installation, which, however will be the case with other known solutions, such as fusible plugs and thermo switches. Another advantage is that the separate unit of the monitoring apparatus for heat detection does not either have to be in electrical contact with the permanent installation, which simplifies the installation, and accordingly this can possibly be performed by unauthorized personnel. Preferably the apparatus according to the invention can not be mechanically reset, thus preventing it from being subjected to mechanical wear.

The invention shall now be described in detail with reference to the accompanying drawings, showing a typical, non-limiting exemplary embodiment. The relevant parts are given reference numerals that also will be found in the following description.

OVERVIEW OF THE DRAWINGS

FIG. 1 shows a monitoring apparatus 30 mounted on a junction box in an electric installation.

Figure 1A:
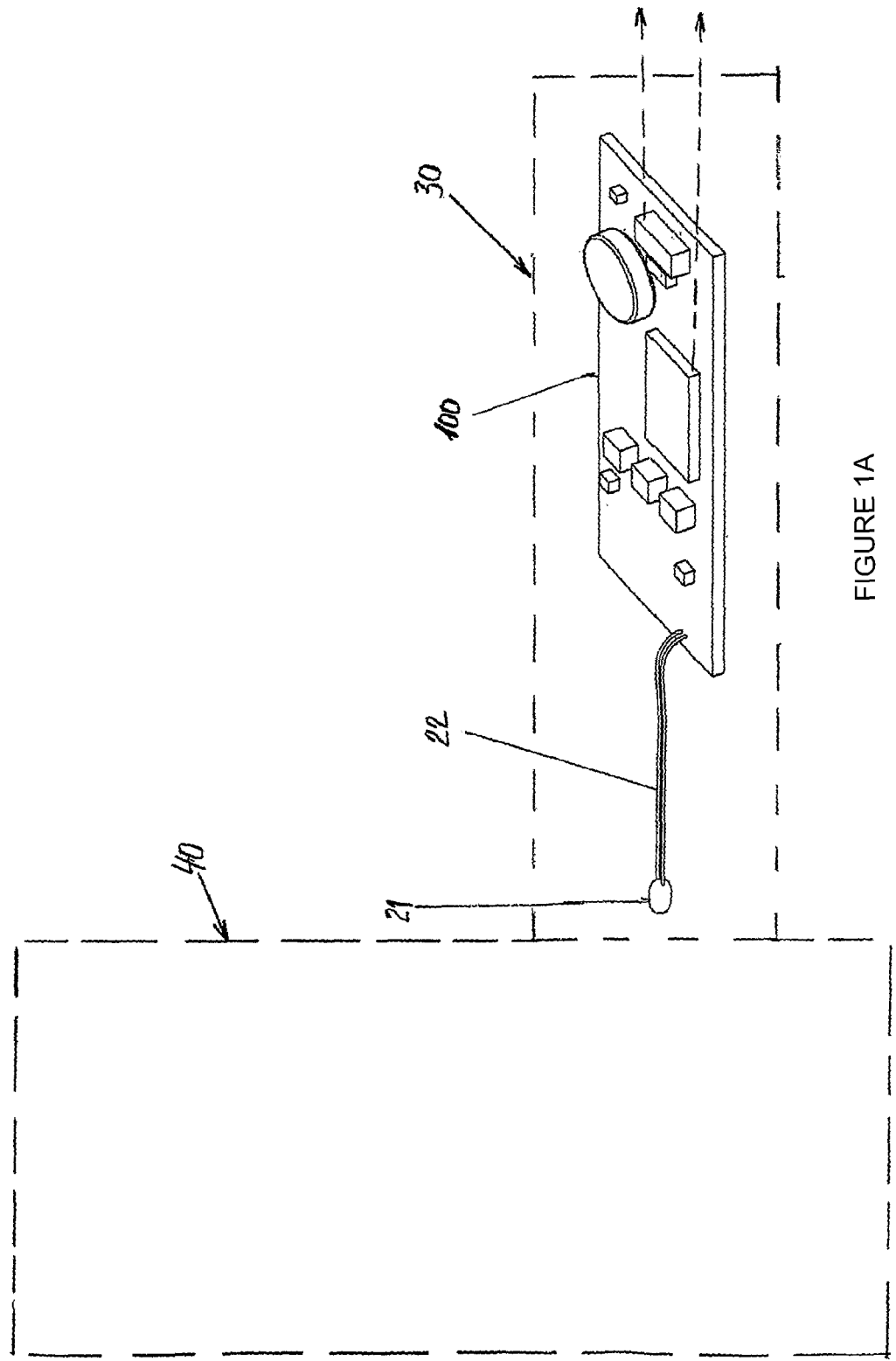

FIG. 1A schematically illustrates a preferred arrangement in the monitoring apparatus 30.

Figure 2:
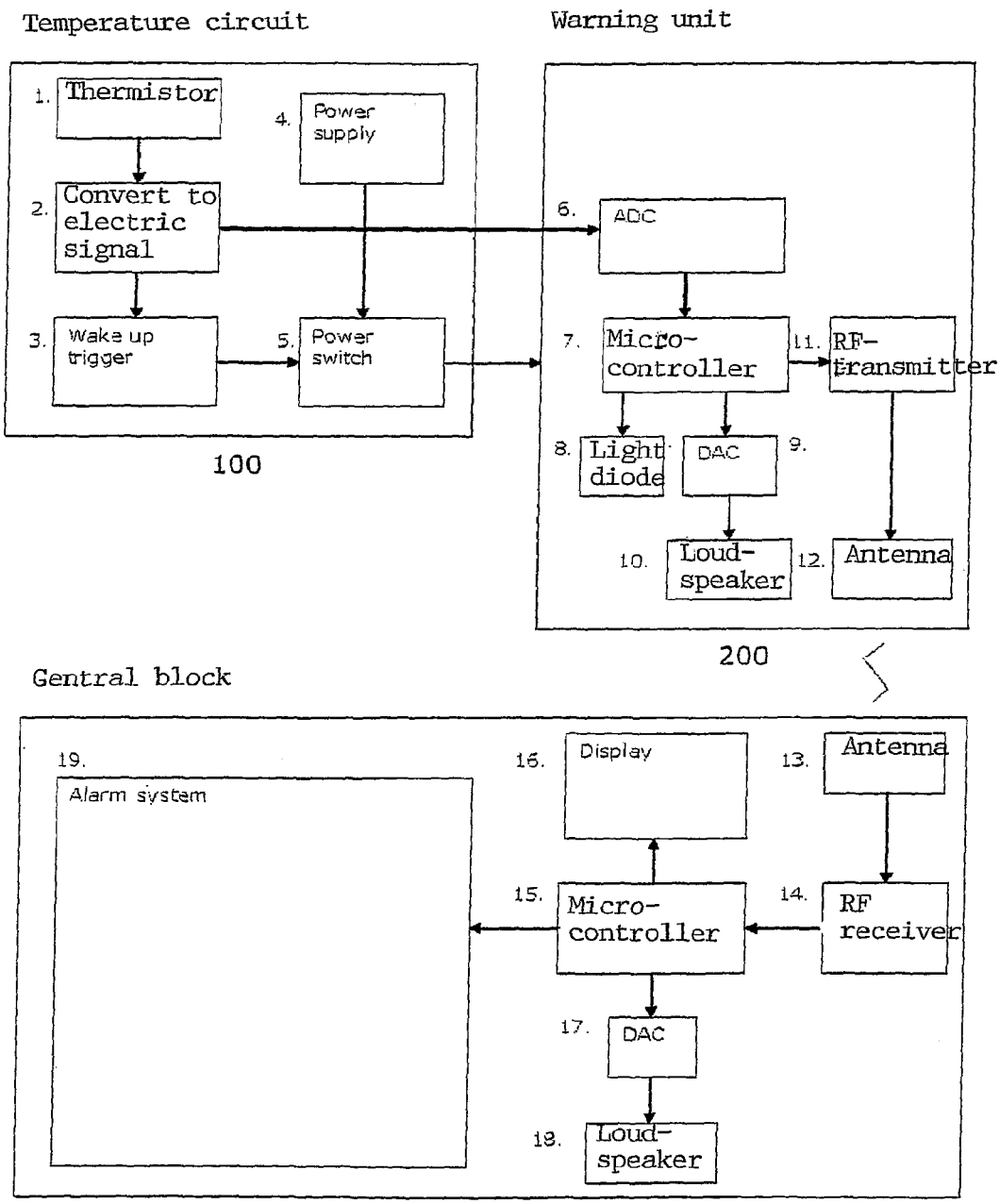

FIG. 2 in block schematic form shows the individual elements of the apparatus, grouped into a temperature detection unit 100 ("temperature circuit"), a warning unit 200 and a central block 300.

FIG. 1A schematically and in the principle corresponding to FIG. 1 shows a preferred apparatus with a thermistor 21 which from the associated circuit board 20 with other components and circuits, has been extended with leads 22 of a suitable length, from the actual circuit board 20, in order that the thermistor 21 shall be positioned adjacent to the connection box 40 and electric components or circuits therein, that may be subjected to unwanted heat development. Thereby a reliable monitoring function is secured for the electric installation portion concerned, as for example a connection box, an outlet or other device.

Overview of the Main Elements of the Monitoring Apparatus—See FIG. 2

1. The temperature detection is carried out in unit 100 by means of a sensor 1 which provides an electrical magnitude that is influenced by the temperature, in this example a thermistor, that is a temperature-dependent resistor. When a low current is sent through such a component it will give a temperature-dependent voltage drop that is measured and is a direct measure of the temperature (approximately analogue relationship).
2. A circuit 2 conducts current through the sensor 1 and measures the voltage across it, and possibly the voltage is converted into a suitable signal. The voltage is applied to a converter (ADC) 6 in the warning unit 200 for conversion into a digital form for acceptance by a following microcontroller 7 in the same unit 200.
3. An activation circuit 3 which is denoted a "wake up trigger" generates a signal when the temperature exceeds a given temperature and controls a current switch 5 (power switch)

which supplies current to the rest of the warning unit 200. The activation circuit 3 (the trigger) can turn itself off at a lower value, for example 30° C., whereas it turns on at 40° C., but possibly so that if the temperature only exceeds 40° C. for a short period, the apparatus will continue to give warning until the temperature has fallen to 30° C.

4. A separate power supply 4 provides for current to operate the circuit and comprises or is connected to a battery (not shown in a drawing). The unit 100 is supplied with current all the time, whereas the warning unit 200 is only energized when the temperature exceeds a certain level controlled by the circuit 3 (the wake up trigger). This is done in order to save current.

5. As a consequence of the switch 5 (the power switch) the warning unit 200 will not be energized until the wake up trigger 3 is active.

An ADC, analogue-to-digital converter 6 converts the voltage that is provided by the thermistor, into a digital signal which can be read by the microcontroller 7. This makes it possible for the microcontroller to read the temperature. The microcontroller 7 is a minicomputer. It can process data and perform various acts. It reads the temperature, generates the signal that drives a light diode 8 and a loudspeaker 10 which can warn with respect to a high temperature. At the same time it controls an RF transmitter 11 which alerts the central block 300 with regard to the temperature level. The light diode 8 emits light which is controlled by the microcontroller 7 to flick, in particular with an increased intensity with increasing temperature.

A DAC, digital-to-analogue converter 9 converts the digital signals from the microcontroller 7 into corresponding analogue signals for amplification and application to the loudspeaker 10 or another warning or alarm device (siren, tone signalling etc.). The loudspeaker 10 shall emit sounds when the temperature is becoming too high. A higher tone pitch, a larger sound volume or another form of signalling at higher temperature can be adjusted via the microcontroller 7. The RF transmitter 11 is the unit that provides for the radio transmission to the central block 300. That which is transmitted, is controlled by the microcontroller. The RF transmitter informs the central with respect to a too high temperature and what is actually the temperature. The RF transmitter emits the signals via antenna 12.

An antenna 13 in the central block 300 conveys the warning signals received, to an RF receiver 13 which further takes the information to a microcontroller 15, so that this can start its own warning when it receives information with respect to a too high temperature via RF. Through a DAC 17 the microcontroller 15 can give warning via its own loudspeaker 18, can show from where the warning originates and what is the temperature, on a display 16 which shows where the warning originates and what is the temperature. Possibly a house alarm or a similar alarm system 19 can be further alerted.

Such a security apparatus detects and warns timely well before any harmful heat development arises, and long before a smoke detector or fuses can react. The unit can also give warning to an existing central unit, as for example an alarm installation or a fuse box, FIG. 2, point 13-19.

The invention claimed is:

1. An electric installation apparatus with means for temperature monitoring and warning in the case of overtemperatures in the electric installation apparatus, and comprising:
   a temperature detection unit comprising at least one temperature sensor, a wake-up trigger, and a power switch, wherein the wake-up trigger is configured to be activated by the temperature detection unit to control the power switch in the case of an overtemperature, and wherein the power switch is configured to energize a warning unit;
   means for converting a temperature detection signal generated by said temperature detection unit, into a digital signal for processing in a microcontroller, which is adapted to control an RF transmitter for wireless signalling to a remote central block; and
   said central block serving for registration of the activity of the warning unit and for activation of mechanisms for preventing further temperature increase or consequences of the temperature already detected or registered,
   wherein said temperature detection unit, said converting means, said microcontroller and said RF transmitter being all located within the confines of the apparatus.

2. Apparatus according to claim 1, wherein the at least one temperature sensor is a temperature-dependent resistor to which there is applied a current from a supply circuit and the voltage drop of which is measured and at a value exceeding a threshold value leads to activation of an activation circuit.

3. Apparatus according to claim 1, wherein the warning unit comprises said transmitter and in addition circuits for activation of an alarm system.

4. Apparatus according to claim 1, wherein the warning unit comprises units for warning at the location with lights and/or sounds with a stepwise increasing intensity as the detected or registered temperature increases.

5. Apparatus according to claim 1, wherein the warning unit comprises units for warning via a direct message to the house owner, an electrician or a security firm.

6. Apparatus according to claim 1, further comprising two temperature sensors being connected differentially for activating an alarm if their temperature difference exceeds a given threshold value.

7. The apparatus of claim 5, wherein said direct message is a SMS or a MMS.

* * * * *